(No Model.)
E. J. SWEDLUND.
SPROCKET CHAIN.
No. 545,214.  Patented Aug. 27, 1895.
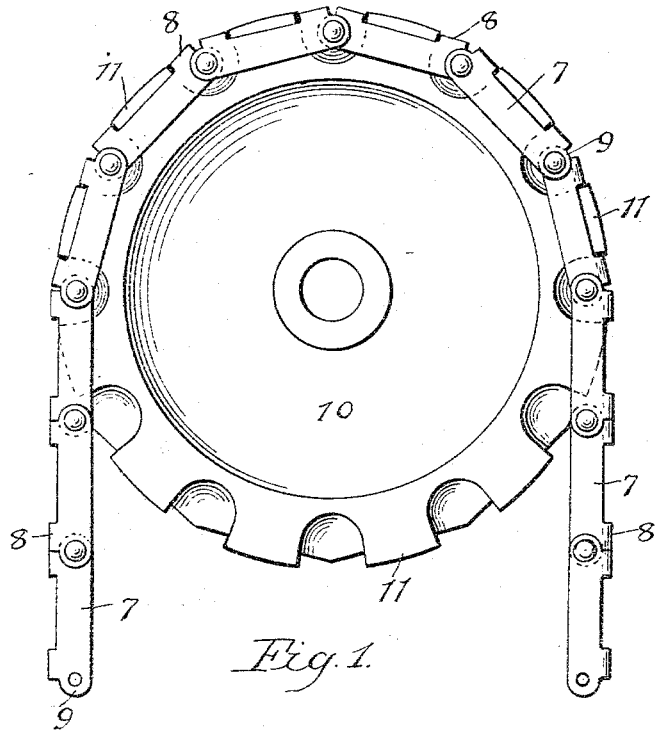
Fig. 1.
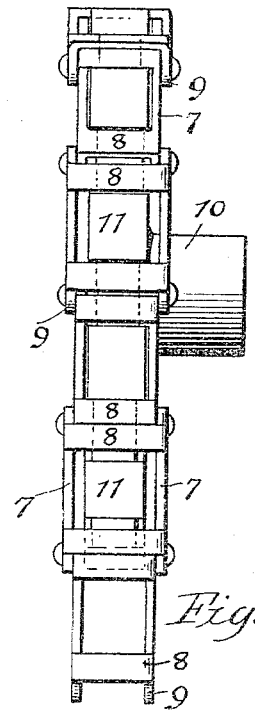
Fig. 2.
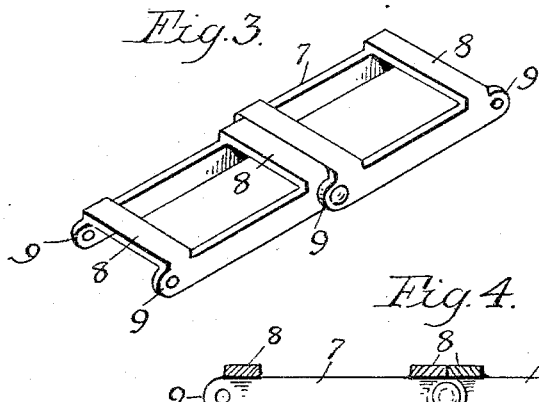
Fig. 3.
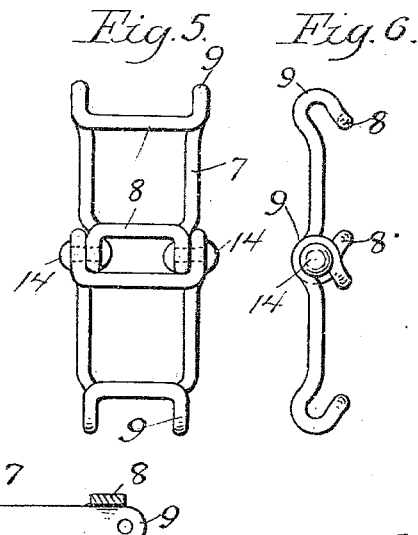
Fig. 5.  Fig. 6.
Fig. 4.
Witnesses
J. Jessen
Richard Paul
Inventor
Erick J. Swedlund
By Paul & Hawley
his attorneys

UNITED STATES PATENT OFFICE.

ERICK J. SWEDLUND, OF ATWATER, MINNESOTA.

SPROCKET-CHAIN.

SPECIFICATION forming part of Letters Patent No. 545,214, dated August 27, 1895.

Application filed October 29, 1894. Serial No. 527,312. (No model.)

*To all whom it may concern:*

Be it known that I, ERICK J. SWEDLUND, of Atwater, Kandiyohi county, State of Minnesota, have invented certain new and useful Improvements in Sprocket-Chains, of which the following is a specification.

My invention relates to sprocket-chains, and the object I have in view is to provide a chain the links of which may be stamped out of sheet metal and their overlapping ends riveted together, thereby forming a very inexpensive and at the same time a very strong and durable chain.

The further object of my invention is to provide a sprocket-chain designed particularly for use on the peculiar form of wheel shown in my application for Letters Patent, Serial No. 513,131, filed June 1, 1894.

My invention consists generally in the construction and combination hereinafter described, and particularly pointed out in the claims.

In the drawings forming part of this specification, Figure 1 is a side view of a sprocket-chain embodying my invention, shown on a wheel similar to that described in the application referred to above. Fig. 2 is a face or edge view thereof. Fig. 3 is a perspective view of the link. Fig. 4 is a sectional view thereof. Fig. 5 is a plan view of a link of modified construction. Fig. 6 is a side view thereof.

As shown in the drawings, the links are of a general rectangular form, preferably stamped out of sheet metal, though they may be cast, if preferred, or made from wire. Each link consists of the straight side portion 7, connected at each end by the cross-bar portions 8, which rest upon the periphery of the wheel 10, between the teeth 11, as shown in Fig. 1. The ends 9 of the straight side portion 7 of each link overlap the adjacent ends 9 of the abutting links, and in this position the abutting and overlapping ends are riveted together, as shown in Fig. 3. When the links are riveted together, it is obvious that the cross-bar portion 8 on the ends of the adjacent links will be in close proximity and will rest upon the edge or face of the wheel 10, between the teeth 11, while the side portions 7 will extend down over the sides of the teeth, as shown in Fig. 1. As the spaces between the teeth are substantially filled by the ends of the links, all wear which might be caused by a relative backward and forward movement of the wheel, caused by changing the load, is avoided. Furthermore, the direction of rotation may be changed repeatedly without danger of extra wear upon the chain or wheel and without danger of throwing the chain off the wheel. As the end of each link is leaving the wheel it is practically in line with the draft-center of the chain or belt, and furthermore is almost on a tangent with the face or periphery of the wheel, so that the greatest possible leverage is obtained thereon through the chain.

Figs. 5 and 6 show a modification, in which the link shown is similar to that described in my application mentioned above, having the side portions 7', the upwardly and inwardly turned cross-bar portions 8', with the intervening loop 9', through which the rivets 14' pass, connecting the links.

I prefer to make the links of sheet metal, having dies of different sizes to stamp out links of any desired size; but the links may be made from wire or rod material, as shown in Figs. 5 and 6, or they may be cast from any suitable material.

Having thus described my invention, I claim as new and desire to secure by Letters Patent—

1. A sprocket chain, composed of links comprising flat sheet metal side portions, cross bar portions connecting the upper longitudinal edges of said side portions, and transverse pivots connecting the overlapping ends of the side portions of adjacent links, substantially as described.

2. A sprocket chain, consisting of the links comprising side portions, the end or cross-bar portions connecting said side portions, and means for pivoting the abutting corners of the links upon one another, in combination, with the sprocket wheel having teeth, and narrower face portions between said teeth whereby side recesses are provided to receive the abutting corners of the links, substantially as described.

3. A sprocket chain, consisting of the links comprising side portions 7, the overlapping parts 9, the cross bar portions 8 at each end thereof behind said overlapping parts, and suitable connections between said overlapping parts, in combination with a sprocket wheel having teeth, and narrower face portions between said teeth whereby recesses are formed to receive the overlapping parts of the links, substantially as described.

4. The sprocket chain, consisting of links comprising side portions, cross bar portions connecting the longitudinal edges of said side portions, the adjacent ends of said side portions being arranged to overlap, means for connecting the overlapping ends of said side portions together, in combination with a sprocket wheel having teeth 2 and narrow face portions 3 between said teeth, said chain being so formed that the spaces between the teeth are substantially filled by the adjacent or overlapping ends of the links, whereby slippage on the face of the wheel is avoided, substantially as described.

In testimony whereof I have hereunto set my hand this 18th day of October, A.D. 1894.

ERICK J. SWEDLUND.

In presence of—
C. F. BURGESS,
HENRY STENE.